US012677994B1

(12) United States Patent
Li

(10) Patent No.: US 12,677,994 B1
(45) Date of Patent: Jul. 14, 2026

(54) FOOD AUXILIARY FUNNEL DEVICE

(71) Applicant: Xin Li, Changde (CN)

(72) Inventor: Xin Li, Changde (CN)

( * ) Notice: Subject to any disclaimer, the term of this patent is extended or adjusted under 35 U.S.C. 154(b) by 0 days.

(21) Appl. No.: 19/440,009

(22) Filed: Jan. 5, 2026

(51) Int. Cl.
  *A47J 43/28* (2006.01)
(52) U.S. Cl.
  CPC ..................................... *A47J 43/28* (2013.01)
(58) Field of Classification Search
  CPC ........... B67C 11/00; B67C 11/02; A47J 43/28
  See application file for complete search history.

(56) References Cited

U.S. PATENT DOCUMENTS

| | | | | |
|---|---|---|---|---|
| 5,195,662 | A | * | 3/1993 | Neff ........................ B65D 25/48 |
| | | | | 222/570 |
| 5,579,963 | A | * | 12/1996 | Murthi ................... B44D 3/128 |
| | | | | 222/570 |
| 10,589,902 | B2 | * | 3/2020 | Carreiro ................. B65D 51/02 |
| 11,046,484 | B2 | * | 6/2021 | Hoyos ................ A47G 19/2216 |

FOREIGN PATENT DOCUMENTS

CN        210214781 U  *  3/2020

* cited by examiner

*Primary Examiner* — Timothy L Maust
(74) *Attorney, Agent, or Firm* — JEEN IP LAW, LLC

(57)          ABSTRACT

A food auxiliary funnel device is provided, which includes a funnel body and an installation structure, the funnel body includes a first funnel body end, a second funnel body end, a first funnel body surface, and a second funnel body surface, so that food ingredients at the first funnel body end will slide down along the first funnel body surface to the second funnel body end; the installation structure includes a connection arm, and the connection arm is provided on the second funnel body surface; the connection arm includes a clamping surface; when the food auxiliary funnel device is provided on an edge of a mixing bowl, the clamping surface and the second funnel body surface clamp two sides of the edge of the mixing bowl respectively; a distance between the clamping surface and the second funnel body surface is configured to be changed.

9 Claims, 7 Drawing Sheets

FOOD AUXILIARY FUNNEL DEVICE

TECHNICAL FIELD

The present disclosure relates to the field of chef machine food auxiliary addition device technologies, and in particular, to a food auxiliary funnel device.

BACKGROUND

Food preparation usually involves the use of food preparation tools. When using food preparation tools to make food, it is necessary to supply different ingredients to the tools in a timely manner. It is quite difficult and troublesome to supply multiple different food ingredients in a short period of time. For example, when adding different amounts and food ingredients to the mixing bowl of a chef machine, it is almost impossible to replenish the required food ingredients to the mixing bowl in a short period of time. Therefore, a user usually uses food auxiliary funnel devices to assist in the addition of food ingredients to meet the needs of food ingredient addition.

At present, food auxiliary funnel devices on the market generally include a funnel body and a connection arm fixedly provided on the funnel body. The connection arm is provided with a connection groove, and the edge of the mixing bowl is inserted into the interior of the connection groove to connect the connection arm with the mixing bowl. When in use, food ingredients enter the interior of the mixing bowl through the funnel body.

Regarding the above-mentioned technologies, the adaptability and universality of food auxiliary funnel devices on the market are currently poor. If the edge size of the mixing bowl is too large or too small, the food auxiliary funnel device cannot be stably connected to the mixing bowl, which results in poor applicability of the food auxiliary funnel device.

SUMMARY

In order to improve the usability of the food auxiliary funnel device, the present application provides a food auxiliary funnel device.

The food auxiliary funnel device provided in this application adopts the following technical solution.

A food auxiliary funnel device, including: a funnel body and an installation structure, and the installation structure is provided on the funnel body, where the funnel body includes a first funnel body end, a second funnel body end away from the first funnel body end, a first funnel body surface, and a second funnel body surface facing away from the first funnel body surface, so that food ingredients at the first funnel body end will slide down along the first funnel body surface to the second funnel body end;

where the installation structure includes a connection arm, and the connection arm is provided on the second funnel body surface; the connection arm includes a clamping surface; when the food auxiliary funnel device is provided on an edge of a mixing bowl, the clamping surface and the second funnel body surface clamp two sides of the edge of the mixing bowl respectively; where a distance between the clamping surface and the second funnel body surface is configured to be changed.

In some embodiments of the present disclosure, the installation structure further includes a clamping elastic sheet, one end of the clamping elastic sheet is connected to the funnel body, and the other end of the clamping elastic sheet is connected to the clamping arm, so that the distance between the clamping surface and the second funnel body surface can be changed, and the clamping surface and the second funnel body surface can respectively clamp and fix the edge of the mixing bowl on two sides.

In some embodiments of the present disclosure, the funnel body is provided with a funnel body groove, and the connection arm is provided with a connection arm slot; when the clamping elastic sheet is connected to the funnel body, one end of the clamping elastic sheet is inserted into the funnel body groove and located inside the funnel body groove; when the clamping elastic sheet is connected to the connection arm, the other end of the clamping elastic sheet is inserted into the connection arm slot and located inside the connection arm slot.

In some embodiments of the present disclosure, the connection arm is fixedly provided with a clamping protrusion, and the clamping protrusion is provided on the clamping surface.

In some embodiments of the present disclosure, the connection arm includes a fixing end and a clamping end, and the fixing end of the connection arm is fixedly connected to the funnel body, so that the edge of the mixing bowl is configured to be between the clamping surface and the second funnel body surface from the clamping end of the connection arm; where the connection arm has elasticity, so that the distance between the clamping surface and the second funnel body surface is configured to be changed.

In some embodiments of the present disclosure, the connection arm is fixedly provided with a first clamping protrusion, and the first clamping protrusion is provided on the clamping surface; a second clamping protrusion is provided at a part of the second funnel body surface corresponding to the clamping surface; the first clamping protrusion and the second clamping protrusion cooperate with each other to clamp and fix the edge of the mixing bowl on two sides.

In some embodiments of the present disclosure, a width of the first funnel body end is greater than a width of the second funnel body end.

In some embodiments of the present disclosure, a shape of the first funnel body is arc-shaped, and a normal direction of the first funnel body faces from the first funnel body towards the second funnel body.

In some embodiments of the present disclosure, the funnel body further includes two third funnel body ends, the two third funnel body ends have the same structural shape, and the two third funnel body ends are arc-shaped, and normal directions of the two third funnel body ends extend from the third funnel body ends towards a direction away from the funnel body.

In some embodiments of the present disclosure, material of the funnel body is a soft material.

In summary, this application includes at least one beneficial technical effect as follows.

When the food auxiliary funnel device needs to be installed on the edge of a chef mixing bowl to assist in the addition of food ingredients to the mixing bowl, the edge of the mixing bowl is threaded between the clamping surface and the second funnel body surface, so that the clamping surface and the second funnel body surface respectively clamp the two sides of the edge of the mixing bowl, thereby allowing the food auxiliary funnel device to be installed on the edge of the mixing bowl. Besides that, the distance between the clamping surface and the second funnel body surface can be changed, thereby allowing the clamping surface and the second funnel body surface to clamp and fix edges of mixing bowls of different sizes, thereby improving the applicability of the food auxiliary funnel device and improving the poor adaptability and universality of current food auxiliary funnel device on the market. If the edge size of the mixing bowl is too large or too small, the food auxiliary funnel device cannot be stably connected to the mixing bowl, resulting in poor applicability of the food auxiliary funnel device.

NUMERAL REFERENCE

100—funnel device; 200—mixing bowl; 1—funnel body; 11—first funnel body end; 12—second funnel body end; 13—first funnel body surface; 14—second funnel body surface; 15—third funnel body end; 1a—funnel body groove; 1b—second clamping protrusion; 2—installation structure; 21—connection arm; 211—clamping surface; 212—fixing end; 213—clamping end; 21a—connection arm slot; 21b—clamping protrusion; 21c—first clamping protrusion; 21d—pressing protrusion; 22—clamping elastic sheet.

DESCRIPTION OF EMBODIMENTS

Further detailed explanation of the present application will be provided in combination with FIGS. 1-7.

Figure 1:
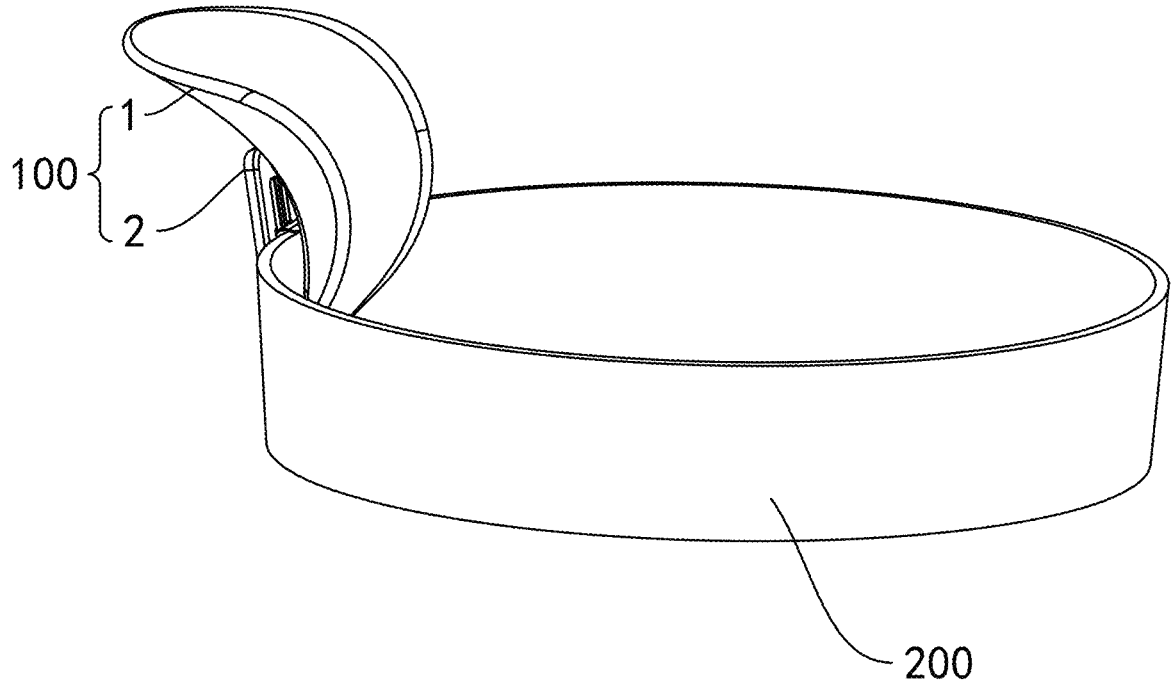
FIG. 1 is a schematic diagram of an overall structure of an embodiment of the present application.
Figure 2:
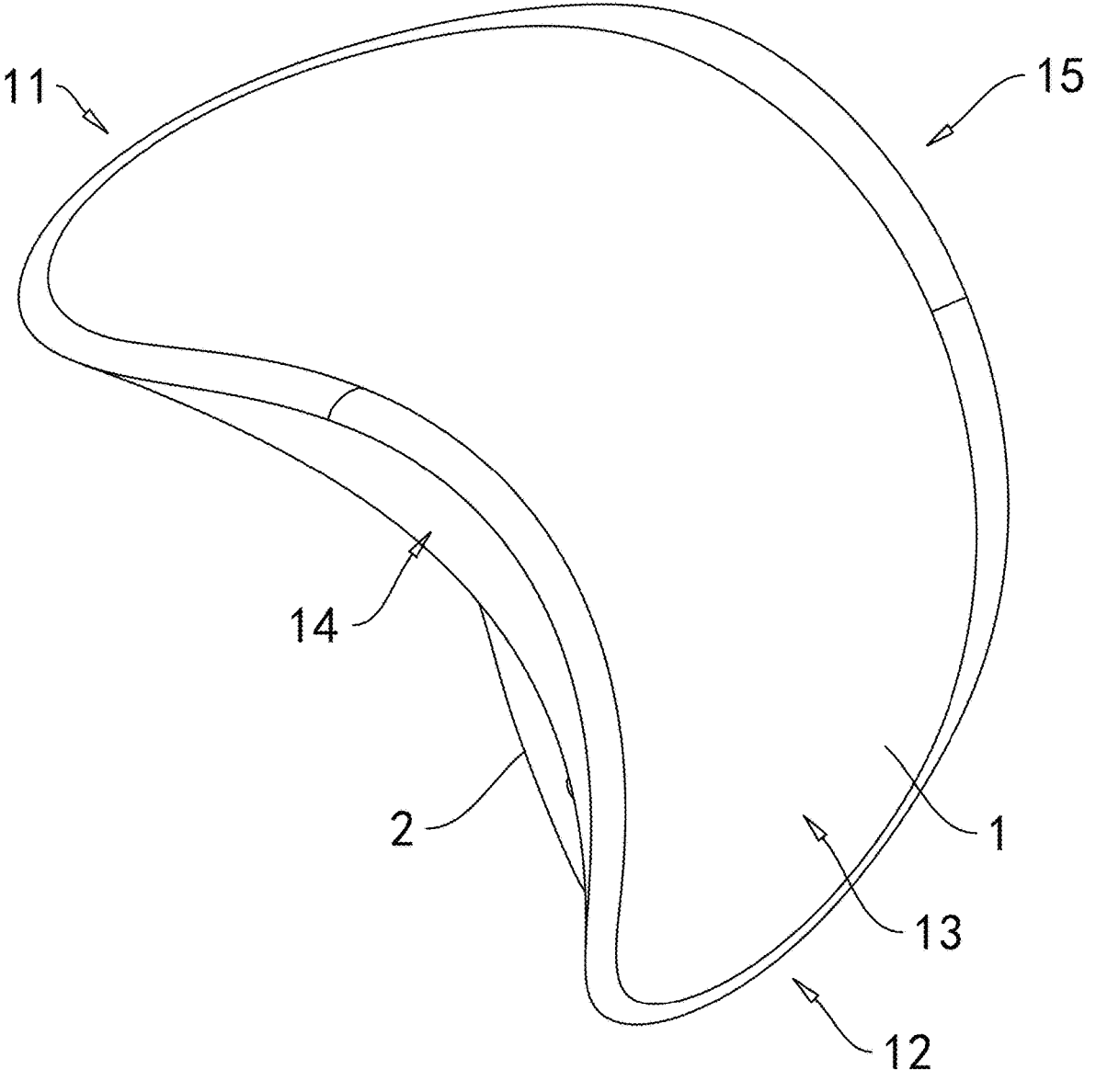
FIG. 2 is a schematic structural diagram of a funnel in an embodiment of the present application.
Figure 3:
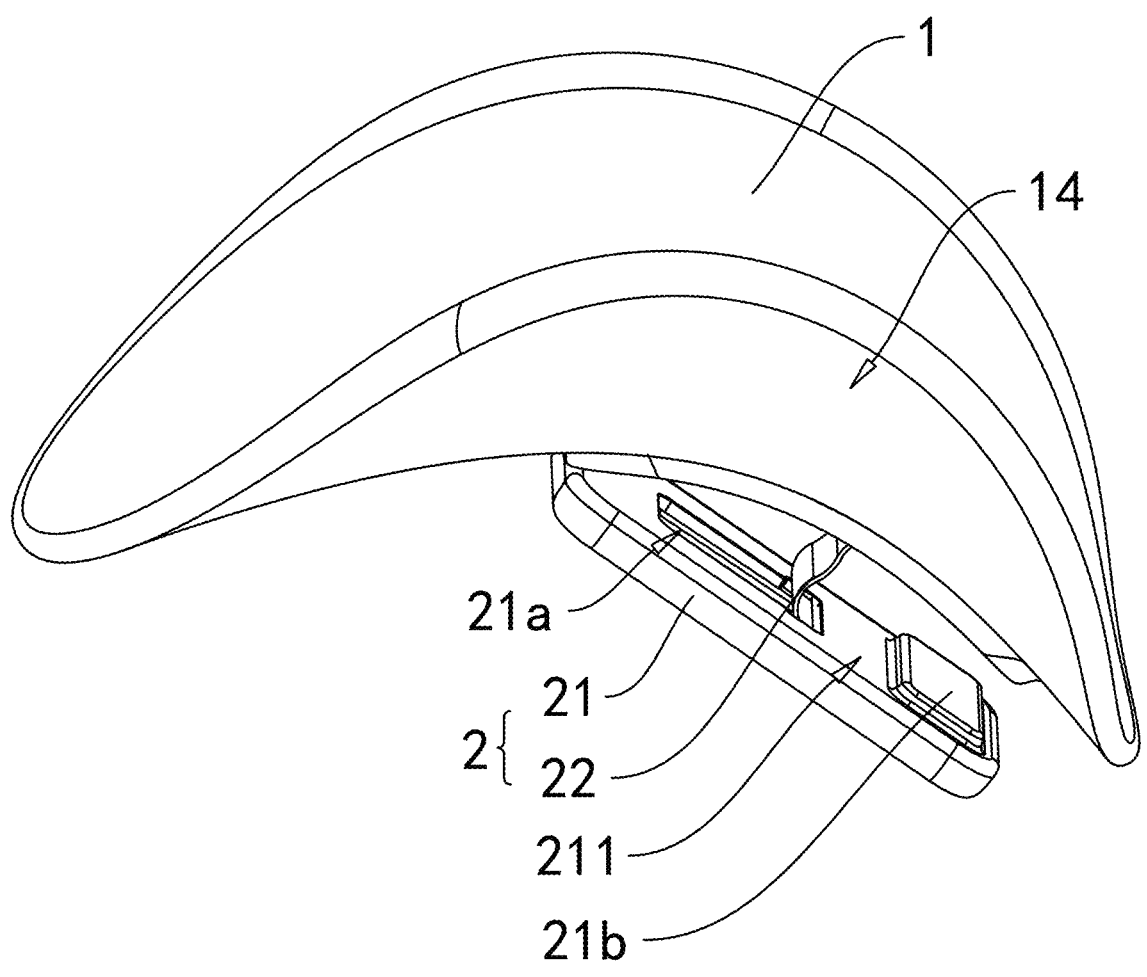
FIG. 3 is a first schematic diagram of an installation structure of an embodiment of the present application.

An embodiment of the present disclosure discloses a food auxiliary funnel device. Referring to FIGS. 1 to 3, the food auxiliary funnel device includes a funnel body 1 and an installation structure 2. The installation structure 2 is provided on the funnel body 1, and the funnel body 1 includes a first funnel body end 11, a second funnel body end 12 away from the first funnel body end 11, a first funnel body surface 13, and a second funnel body surface 14 facing away from the first funnel body surface 13, so that food ingredients at the first funnel body end 11 will slide down along the first funnel body surface 13 to the second funnel body end 12. The installation structure 2 includes a connection arm 21, and the connection arm 21 is provided on the second funnel body surface 14, and the connection arm 21 includes a clamping surface 211. When the food auxiliary funnel device 100 is provided on an edge of the mixing bowl 200, the clamping surface 211 and the second funnel body surface 14 of the mixing bowl 200 is clamped on two sides of the edge, and a distance between the clamping surface 211 and the second funnel body surface 14 can be changed, so that the clamping surface 211 and the second funnel body can be adjusted accordingly, the second funnel body surface 14 can clamp and fix edges of mixing bowls 200 of different thickness sizes on two sides. It should be understood that when the funnel device 100 is provided on the edge of the mixing bowl 200, the second funnel body end 12 extends below the edge of the mixing bowl 200 and enters an interior of the mixing bowl 200, so that the food ingredients can leave the second funnel body end 12 and enter the interior of the mixing bowl 200.

Figure 4:
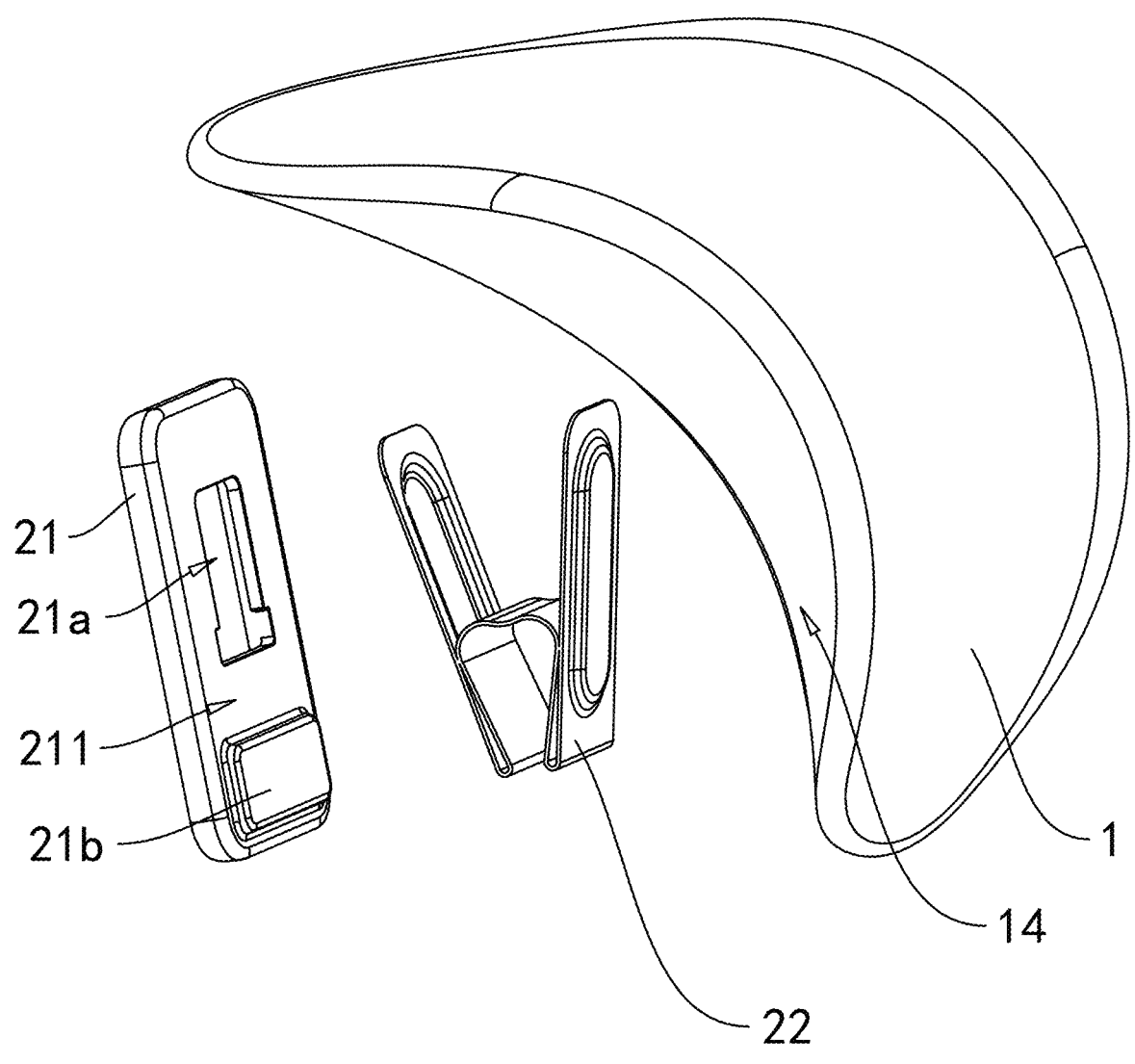
FIG. 4 is a first exploded view of the installation structure in an embodiment of the present application.
Figure 5:
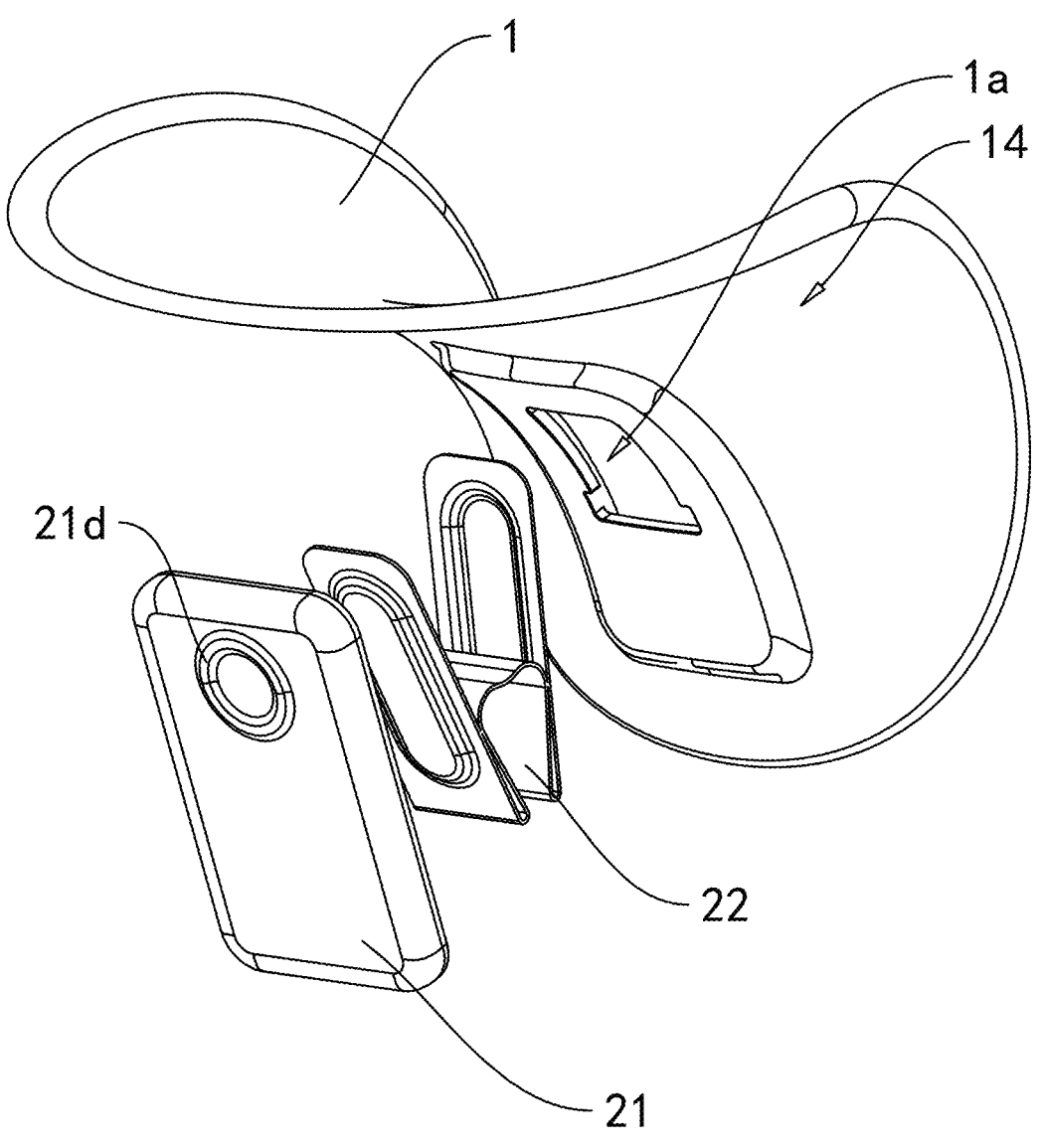
FIG. 5 is a second exploded view of the installation structure in an embodiment of the present application.

Referring to FIGS. 3 to 5, in an implementation mode, the installation structure 2 can include a clamping elastic sheet 22. One end of the clamping elastic sheet 22 is connected to the clamping funnel body 1, and the other end of the clamping elastic sheet 22 is connected to the clamping arm, so that the connection arm 21 is connected to the funnel body 1. It can be understood that after the connection arm 21 is connected to the funnel body 1 through the clamping elastic sheet 22, a distance between the clamping surface 211 and the second funnel body surface 14 is changed by manually pressing one end of the connection arm 21, so that the clamping surface 211 and the second funnel body surface 14 can clamp and fix the edges of the mixing bowls 200 with different thickness sizes on two sides. In an implementation mode, the connection arm 21 is fixedly provided with a pressing protrusion 14d, which facilitates the pressing of one end of the connection arm 21 by manual or other means. In an implementation mode, the funnel body 1 is provided with a funnel body groove 1a, the connection arm 21 is provided with a connection arm slot 21a. When the clamping elastic sheet 22 is connected to the funnel body 1, one end of the clamping elastic sheet 22 is inserted into the funnel body groove 1a and located inside the funnel body groove 1a. When the clamping elastic sheet 22 is connected to the connection arm 21, the other end of the clamping elastic sheet 22 is inserted into the connection arm slot 21a and located inside the connection arm slot 21a, thereby reducing an exposed area of the clamping elastic sheet 22 to outside air and protecting it from the funnel body 1 and the connection arm 21, thereby improving the service life of the clamping elastic sheet 22. In an implementation mode, the connection arm 21 is fixedly provided with a clamping protrusion 21b, and the clamping protrusion 21b is located in the clamping protrusion 21b. By holding the clamping surface 211, the stability of clamping and fixing the edge of the mixing bowl 200 with the second funnel body surface 14 can be further improved.

Figure 6:
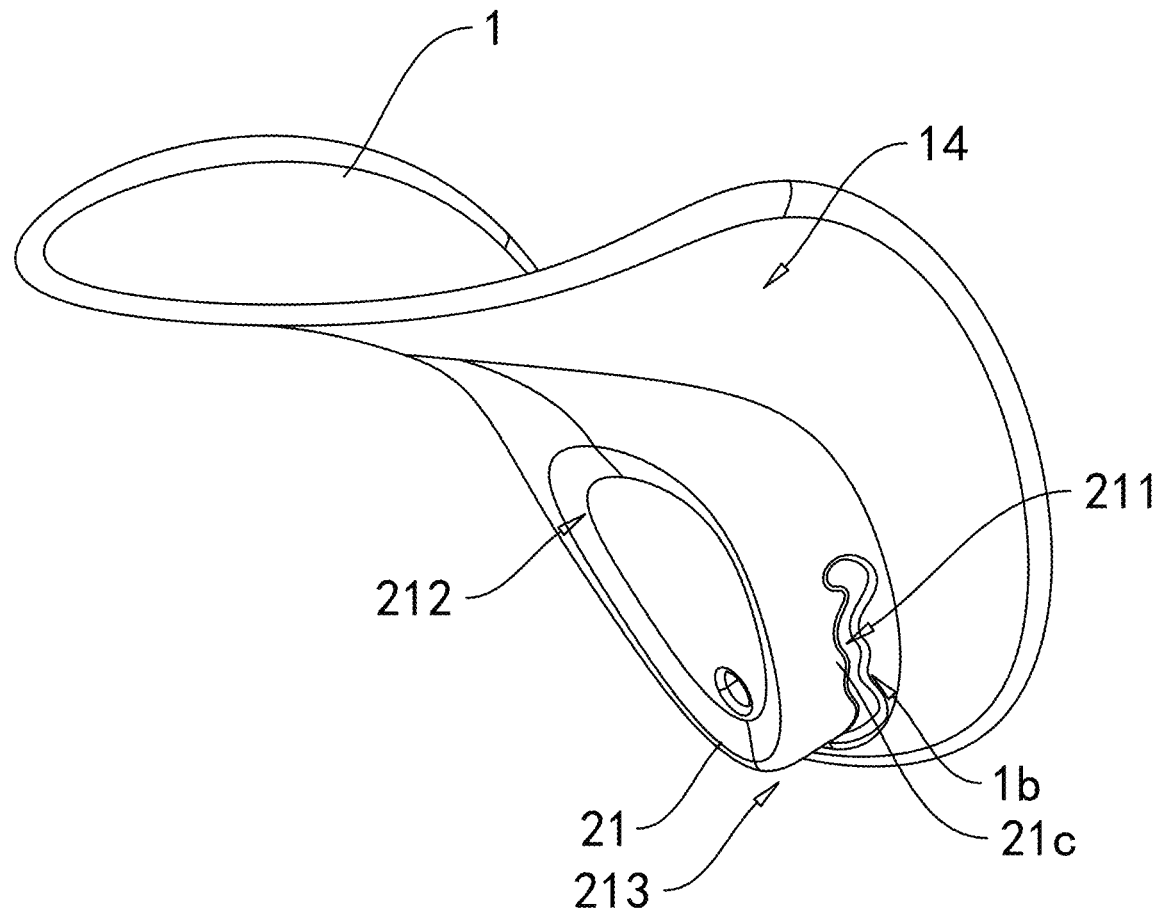
FIG. 6 is a second schematic diagram of the installation structure in an embodiment of the present application.
Figure 7:
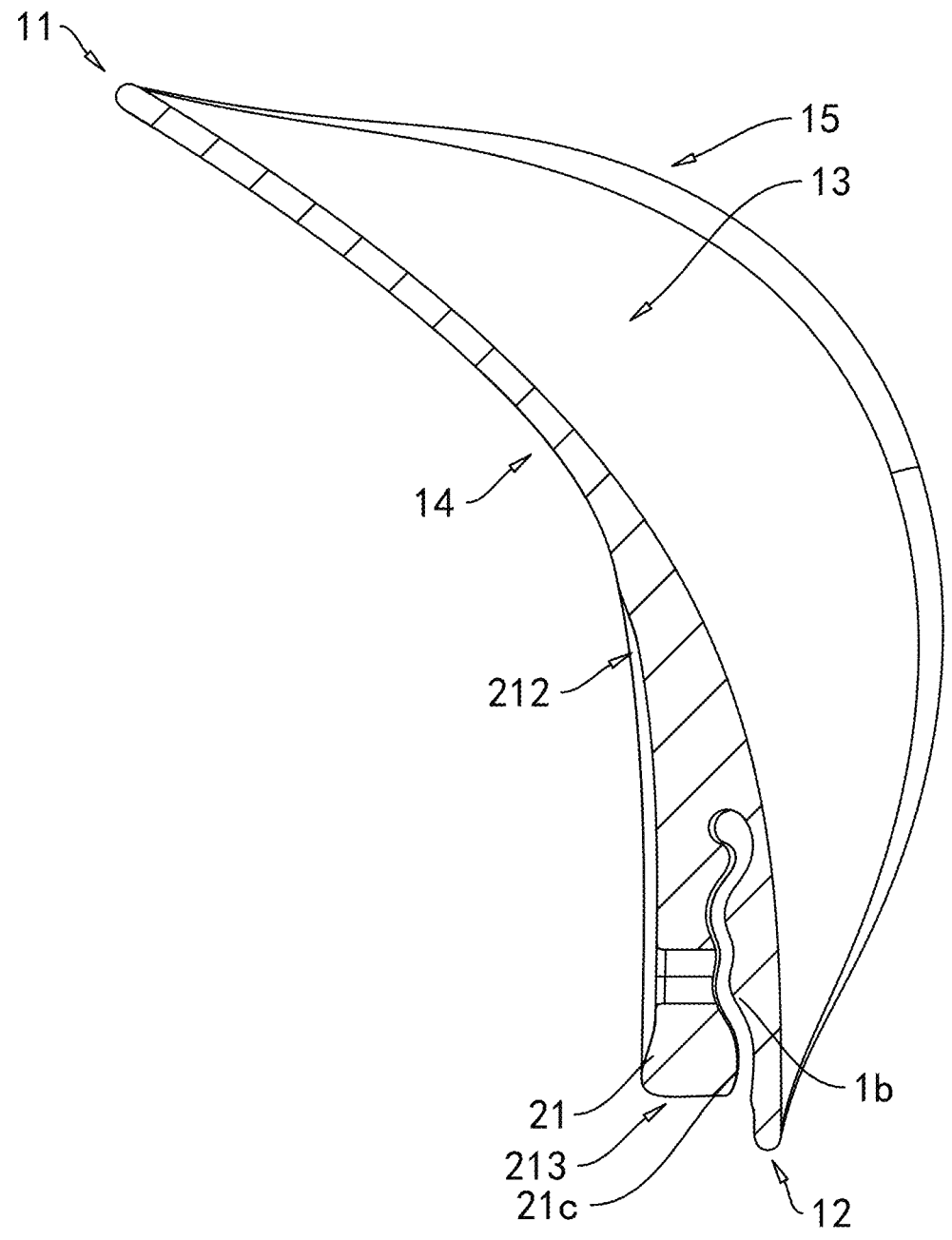
FIG. 7 is a sectional view of the installation structure in an embodiment of the present application.

Referring to FIGS. 6 and 7, in an implementation mode, the connection arm 21 includes a fixing end 212 and a clamping end 213. The fixing end 212 of the connection arm 21 is fixedly connected to the funnel body 1, and the clamping end 213 of the connection arm 21 has a gap with the second funnel body surface 14, so that the edge of the mixing bowl 200 can enter between the clamping surface 211 and the second funnel body surface 14 from the clamping end 213 of the connection arm 21, so that the clamping surface 211 and the second funnel body surface 14 can clamp and fix the edge of the mixing bowl 200. The connection arm 21 has elasticity, so that the distance between the clamping surface 211 and the second funnel body surface 14 can be changed. In an implementation mode, the material of the connection arm 21 can be silicone gel, rubber, Thermo-Plastic-Rubber, (TPR), Thermoplastic Elastomer, (TPE), Thermoplastic Polyurethane, (TPU), Polyvinyl chloride, (PVC) and other materials are not limited to the specific material of the connection arm 21 in this embodiment of the application. In an implementation mode, the connection arm 21 is fixedly provided with a first clamping protrusion 21c, and the first clamping protrusion 21c is provided on the clamping surface 211. A part of the second funnel body surface 14 corresponding to the clamping surface 211 is provided with a first clamping protrusion 21c. The first clamping protrusion 21c and the second clamping protrusion 1b cooperate with each other to clamp and fix the edge of the mixing bowl 200 on two sides. In an implementation mode, the structural shapes of the first clamping protrusion 21c and the second clamping protrusion 1b are irregular wavy, and the first clamping protrusion 21c and the second clamping protrusion 1b correspond to each other, so as to further clamp and fix the mixing bowl 200, so as to improve the stability of clamping and fixing the edge of the mixing bowl 200 on two sides by the clamping surface 211 and the second funnel body surface 14.

In an embodiment of the present disclosure, a width dimension of the first funnel body end 11 is greater than a width dimension of the second funnel body end 12. It should be understood that the width dimension of the first funnel body end 11 is a straight-line distance between two farthest points of the first funnel body end 11, and the width dimension of the second funnel body end 12 is a straight-line distance between two farthest points of the second funnel body end 12.

Referring to FIG. 2, in the embodiment of the present application, the shape of the first funnel body surface 13 is arc-shaped, and a normal direction of the first funnel body surface 13 faces the second funnel body surface 14 from the first funnel body surface 13. It can be understood that a normal direction of the first funnel body surface 13 is a direction perpendicular to a tangent direction of an arc when the first funnel body surface 13 extends from the first funnel body end 11 to the second funnel body end 12, which is a normal direction of the first funnel body surface 13.

Referring to FIG. 2, in the embodiment of the present application, the funnel body 1 further includes two third funnel body ends 15, and the two third funnel body ends 15 have the same structural shape. The two third funnel body ends 15 are arc-shaped, and normal directions of the two third funnel body ends 15 extend away from the funnel body 1 from the third funnel body ends 15.

Referring to FIG. 2, in the embodiment of the present application, the material of the funnel body 1 is a soft material. In an implementation mode, the material of the funnel body 1 can be silicone, rubber, TPR, TPE, TPU, PVC, etc., so that after the funnel device 100 collides with the working chef machine or other equipment, the funnel device 100 cannot cause damage to the chef machine or other equipment, and the deformed funnel device 100 can be restored to its original shape.

The implementation principle of the food auxiliary funnel device 100 in this application is as follows: when the food auxiliary funnel device 100 needs to be installed on the edge of the mixing bowl 200 of the chef machine to assist in the addition of food ingredients to the mixing bowl 200, the edge of the mixing bowl 200 is inserted between the clamping surface 211 and the second funnel body surface 14, so that the clamping surface 211 and the second funnel body surface 14 respectively clamp the two sides of the edge of the mixing bowl 200, thereby installing the food auxiliary funnel device 100 on the edge of the mixing bowl 200. Besides that, because the distance between the clamping surface 211 and the second funnel body surface 14 can be changed, so that the clamping surface 211 and the second funnel body surface 14 can clamp and fix the edges of the mixing bowls 200 of different sizes, thereby improving the applicability of food auxiliary funnel device 100 and improving the poor adaptability and universality of the food auxiliary funnel device 100 currently on the market. If the edge size of the mixing bowl 200 is too large or too small, the food auxiliary funnel device 100 cannot be stably connected to the mixing bowl 200, which results in poor applicability of the food auxiliary funnel device 100.

The above are preferred embodiments of the present application and do not limit the protection scope of the present application. Therefore, any equivalent changes made according to the structure, shape, and principle of the present application should be included in the protection scope of the present application.

What is claimed is:

1. A food auxiliary funnel device, comprising: a funnel body and an installation structure, and the installation structure is provided on the funnel body, wherein the funnel body comprises a first funnel body end, a second funnel body end away from the first funnel body end, a first funnel body surface, and a second funnel body surface facing away from the first funnel body surface, so that food ingredients at the first funnel body end will slide down along the first funnel body surface to the second funnel body end;

wherein the installation structure comprises a connection arm, and the connection arm is provided on the second funnel body surface; the connection arm comprises a clamping surface; when the food auxiliary funnel device is provided on an edge of a mixing bowl, the clamping surface and the second funnel body surface clamp two sides of the edge of the mixing bowl respectively;

wherein a distance between the clamping surface and the second funnel body surface is configured to be changed;

wherein the installation structure further comprises a clamping elastic sheet;

wherein the funnel body is provided with a funnel body groove, and the connection arm is provided with a connection arm slot;

when the clamping elastic sheet is connected to the funnel body, one end of the clamping elastic sheet is inserted into the funnel body groove and located inside the funnel body groove;

when the clamping elastic sheet is connected to the connection arm, the other end of the clamping elastic sheet is inserted into the connection arm slot and located inside the connection arm slot.

2. The food auxiliary funnel device according to claim 1, wherein one end of the clamping elastic sheet is connected to the funnel body, and the other end of the clamping elastic sheet is connected to the clamping arm, so that the distance between the clamping surface and the second funnel body surface can be changed, and the clamping surface and the second funnel body surface can respectively clamp and fix the edge of the mixing bowl on two sides.

3. The food auxiliary funnel device according to claim 2, wherein the connection arm is fixedly provided with a clamping protrusion, and the clamping protrusion is provided on the clamping surface.

4. The food auxiliary funnel device according to claim 1, wherein the connection arm comprises a fixing end and a clamping end, and the fixing end of the connection arm is fixedly connected to the funnel body, so that the edge of the mixing bowl is configured to be between the clamping surface and the second funnel body surface from the clamping end of the connection arm;

wherein the connection arm has elasticity, so that the distance between the clamping surface and the second funnel body surface is configured to be changed.

5. The food auxiliary funnel device according to claim 4, wherein the connection arm is fixedly provided with a first clamping protrusion, and the first clamping protrusion is provided on the clamping surface;

a second clamping protrusion is provided at a part of the second funnel body surface corresponding to the clamping surface;

the first clamping protrusion and the second clamping protrusion cooperate with each other to clamp and fix the edge of the mixing bowl on two sides.

6. The food auxiliary funnel device according to claim 1, wherein a width of the first funnel body end is greater than a width of the second funnel body end.

7. The food auxiliary funnel device according to claim 1, wherein a shape of a first funnel body is arc-shaped, and a normal direction of the first funnel body faces from the first funnel body towards a second funnel body.

8. The food auxiliary funnel device according to claim 1, wherein the funnel body further comprises two third funnel body ends, the two third funnel body ends have the same structural shape, and the two third funnel body ends are arc-shaped, and normal directions of the two third funnel body ends extend from the third funnel body ends towards a direction away from the funnel body.

9. The food auxiliary funnel device according to claim 1, wherein material of the funnel body is a soft material.

\* \* \* \* \*